2,210,317
Patented Oct. 5, 1965

3,210,317
CRYSTALLINE POLYOLEFINS STABILIZED WITH TETRAPROPENYLSUCCINIC ANHYDRIDE
Cornelio Caldo, Terni, Italy, assignor to Montecatini, Società Generale per l'Industria Mineraria e Chimica, a corporation of Italy
No Drawing. Filed June 12, 1961, Ser. No. 116,281
Claims priority, application Italy, June 15, 1960, 10,645/60
3 Claims. (Cl. 260—45.8)

The present invention relates to polymeric compositions of crystalline alpha-olefin polymers such as polypropylene, which compositions are stabilized against heat, ageing and light, and relates to articles obtained therefrom, such as fibres, films, tapes, and the like.

It is well known that crystalline polyolefins undergo a certain degradation during hot working, particularly in the presence of atmospheric oxygen. It is also known that manufactured articles from such crystalline polyolefins are sensitive to the action of light and to thermal treatment.

This degradation can be reduced by the addition of certain protective substances to the polymer, such addition generally being effected during the preparation of fibres, films, etc., from the polymer. Materials used for this purpose have included minute quantities of amines, amino-phenols, chelates of transition metals (Ni), organotin compounds, triazolic compounds, zinc compounds, dithiocarbamates, phenols, phosphites, mercaptans, oximes, polyquinolines, sulfur derivatives, and the like.

An object of the present invention is to provide another method of stabilizing crystalline polyolefins from heat and light degradation, and to provide an improved stabilized crystalline polyolefin composition.

Additional objects will become apparent hereinafter.

I have surprisingly found that tetrapropenylsuccinic anhydride exhibits a high stabilizing action against heat, ageing and light when mixed, in an amount lower than or equal to 2% of the weight of the polymer, with a crystalline olefin polymer, which polymer may be used to produce fibres or films.

This compound also functions as a stabilizer for a composition comprising a polyolefin and a basic nitrogen compound, such as those formed from polypropylene and polyalkyleneimine as disclosed in our copending U.S. patent application Ser. No. 702,430 filed on December 12, 1957, now Patent No. 3,107,228, which may be used to produce textile fibres having improved tinctorial characteristics.

The present invention therefore contemplates a composition comprising a crystalline polyolefin and particularly a crystalline polypropylene, stabilized against heat, ageing and light degradation by the addition thereto from about 0.02% to 2% by weight, preferably 0.2% to 1% by weight of the polymer of tetrapropenylsuccinic anhydride.

The addition of the tetrapropenylsuccinic anhydride is generally carried out by mixing this compound with the polyolefin while agitating. However, the anhydride may be added to the polyolefin by other methods such as, e.g., by mixing the polyolefin with a solution of the stabilizer in a suitable solvent followed by evaporating of the solvent, or by adding the stabilizer to the polyolefin at the end of the polymerization thereof. Alternately, one can obtain the desired stabilizing action by applying the stabilizing compound onto the manufactured article, e.g., by immersing the article in a solution or dispersion of stabilizer and then evaporating off the solvent or dispersing medium.

The tetrapropenylsuccinic anhydride utilized according to the invention exhibits good compatibility with the polyolefin when in the molten state and does not stain the polymer.

The stabilized compositions of the present invention are particularly suitable for preparing mono- and pluri-filaments, staples, dyeable yarns, bulk yarns, films, tapes, shaped articles, and the like.

The addition of an inorganic salt of stearic acid, e.g., calcium stearate, to the stabilized composition of the present invention before the spinning thereof has been found to improve the stability characteristics of such composition. The stearic acid salt functions as an antacid agent.

The following examples will further illustrate the invention without limiting its scope. All parts are by weight unless otherwise stated. The polypropylene used in these examples consists prevailingly of isotactic macromolecules as defined by Natta, e.g., U.S. patent 2,882,263.

*Example 1*

In a Werner type mixer a homogeneous mixture is prepared at room temperature from 9.98 kg. of polypropylene (prepared with the aid of stereospecific catalysts such as those consisting of $AlEt_3$ and $TiCl_3$ and having an intrinsic viscosity $[\eta]$ determined in tetrahydronaphthalene at 135° C. of 1.34, a residue from the heptane extraction of 93.4%, and an ash content of 0.028%) and 20 g. of tetrapropenylsuccinic anhydride. The stabilizer-polymer mixture produced a virtually colorless molten mass when subjected to melting in a test tube maintained in a thermostatic bath at 250° C. for 10 minutes. The mix is spun in a melt spinning device under the following conditions:

Screw temperature _____ 220° C.
Head temperature _____ 220° C.
Spinneret temperature _____ 230° C.
Spinneret type _____ 60 x 0.8 x 16 mm.
Maximum pressure _____ 40 kg./cm².
Winding speed _____ 300 meters/minute.

The fibres are stretched with a stretching ratio of 1:5.3 at 130° C. The characteristics of the fibres obtained are as follows:

Tenacity _____g./den__ 4.13
Elongation _____percent__ 26.2

Upon transition of the stabilized polymer to a fibre the intrinsic viscosity $[\eta]$ is lowered to 76% of its initial value, whereas the same transition of the unstabilized polymer control causes the viscosity to be lowered to 74.5% of the initial value. The stabilized yarn, when exposed for 15 hours to the action of heat in an oven provided with air circulation at 120° C. (accelerated ageing test) remains virtually unaltered in its characteristics whereas the non-stabilized yarn when exposed for 15 hours to the action of heat in an oven with air circulation at 120° C. appears to be brittle.

Exposure of the stabilized fibre to an ultraviolet lamp for 20 hours lowers its tenacity to 47% of the initial value, whereas the tenacity of the non-stabilized fibre is lowered to 32% of the initial value.

*Example 2*

In a Werner type mixer a homogeneous mixture is prepared at room temperature from 9.95 kg. of polypropylene (prepared with the aid of stereospecific catalysts such as those consisting of $AlEt_3$ and $TiCl_3$ and having an intrinsic viscosity $[\eta]$, determined in tetrahydro-naphthalene at 135° C., of 1.46, a residue from the heptane extraction of 94.1% and an ash content of 0.07%) and 50 g. of tetrapropenylsuccinic anhydride. The stabilized polymer mix produces a virtually colorless molten mass when subjected to melting in a test tube maintained in a thermostatic bath at 250° C. for 10 minutes.

The mix is spun in a melt spinning device under the following conditions:

| | |
|---|---|
| Screw temperature | 200° C. |
| Head temperature | 250° C. |
| Spinneret temperature | 190° C. |
| Spinneret type | 60/0.8 x 16 mm. |
| Maximum pressure | 50 kg./cm.$^2$. |
| Winding speed | 400 meters/minute. |

The fibres are stretched with a stretching ratio of 1:5.3 at 150° C. The characteristics of the fibres obtained are as follows:

| | |
|---|---|
| Tenacity _____g./den__ | 5.2 |
| Elongation _____percent__ | 21 |

Transition from stabilized polymer to fibre causes the intrinsic viscosity $[\eta]$ to be lowered to 91% of its starting value, whereas the viscosity $[\eta]$ of the unstabilized polymer control is lowered to 73% of the initial value. The stabilized yarn, when exposed for 15 hours to the action of heat in an oven provided with air circulation at 120° C. (accelerated ageing test) remains materially unaltered in its characteristics where as the non-stabilized yarn when exposed for 15 hours to the action of heat in an oven provided with air circulation at 120° C. appears to be brittle. Upon exposure to an ultraviolet mercury lamp for 20 hours the stabilized fibre shows a reduction in its tenacity to 42% of the initial value, while with the non-stabilized fibre the tenacity is lowered to 32% of its initial value.

*Example 3*

In a Werner type mixer a homogeneous mixture is prepared at room temperature from 9.95 kg. of polypropylene (prepared with the aid of stereospecific catalysts such as those consisting of AlEt$_3$ and TiCl$_3$ and having an intrinsic viscosity $[\eta]$ determined in tetrahydronaphthalene at 135° C. of 1.34, a residue from the heptane extraction of 93.4%, and an ash content of 0.028%) and 50 g. of tetrapropenylsuccinic anhydride. The stabilizer-polymer mix gives a nearly colorless molten mass when subjected to melting in a test tube kept in a thermostatic bath at 250° C. for 10 minutes.

The mix is spun in a melt spinning device under the following conditions:

| | |
|---|---|
| Screw temperature | 220° C. |
| Head temperature | 220° C. |
| Spinneret temperature | 230° C. |
| Spinneret type | 60/0.8 x 16 mm. |
| Maximum pressure | 40 kg./cm.$^2$. |
| Winding speed | 300 meters/minute. |

The fibres are stretched with a stretching ratio of 1:5.3 at 130° C. The characteristics of the fibres obtained are as follows:

| | |
|---|---|
| Tenacity _____g./den__ | 4.37 |
| Elongation _____percent__ | 26.9 |

Upon transition from stabilized polymer to fibre the intrinsic viscosity $[\eta]$ is lowered to 80% of the starting value, whereas the viscosity $[\eta]$ of the non-stabilized polymer control is lowered to 74.5% of the initial value. The stabilized yarn, when exposed for 15 hours to the action of heat in an oven provided with air circulation at 120° C. (accelerated ageing test) remains nearly unaltered in its characteristics whereas the non-stabilized yarn exposed for 15 hours to the action of heat in an oven with air circulation at 120° C. appears to be brittle. Upon exposure to an ultraviolet mercury lamp for 20 hours the stabilized fibre shows a reduction in its tenacity to 45% of the initial value, whereas with the non-stabilized fibre the tenacity is lowered to 32% of the initial value.

*Example 4*

In a Werner type mixer a homogeneous mixture is prepared at room temperature from 9.9 kg. of polypropylene (prepared with the aid of stereospecific catalysts such as those consisting of AlEt$_3$ and TiCl$_3$ and having an intrinsic viscosity $[\eta]$ determined in tetrahydronaphthalene at 135° C. of 1.34, a residue from the heptane extraction of 93.4%, and an ash content of 0.028%) and 100 g. of tetrapropenylsuccinic anhydride.

The stabilized polymer mix produces a nearly colorless molten mass when subjected to melting in a test tube kept in a thermostatic bath at 250° C. for 10 minutes.

The mix is spun in a melt spinning device under the following conditions:

| | |
|---|---|
| Screw temperature | 220° C. |
| Head temperature | 220° C. |
| Spinneret temperature | 230° C. |
| Spinneret type | 60/0.8 x 16 mm. |
| Maximum pressure | 40 kg./cm.$^2$. |
| Winding speed | 300 meters/minute. |

The fibres are stretched with a stretching ratio of 1:5.3 at 130° C. The characteristics of the fibres obtained are as follows:

| | |
|---|---|
| Tenacity _____g./den__ | 4.37 |
| Elongation _____percent__ | 25 |

Upon transition from stabilized polymer to fibre the intrinsic viscosity $[\eta]$ is lowered to 86% of the starting value, whereas the viscosity $[\eta]$ of the non-stabilized polymer control is lowered to 74.5% of the initial value. The stabilized yarn, when exposed for 15 hours to the action of heat in an oven provided with air circulation at 120° C. (accelerated ageing test) remains essentially unaltered in its characteristics whereas the non-stabilized yarn exposed to the action of heat in the same conditions appears to be brittle. Upon exposure to an ultraviolet mercury lamp for 20 hours the stabilized fibre shows a reduction in tenacity to 64% of the initial value, whereas the non-stabilized fibre shows a reduction in tenacity to 32% of the initial value.

Variations can of course be made without departing from the spirit of the invention.

Having thus described the invention, what I desire to secure and claim by Letters Patent is:

1. A polymeric composition of a crystalline alpha-olefin polymer, this composition containing from about 0.02% to 2% by weight of the polymer of tetrapropenyl-succinic anhydride as a stabilizer against heat, ageing and light.

2. The composition of claim 1 wherein said crystalline alpha-olefin polymer is polypropylene consisting prevailingly of isotactic macromolecules.

3. The polymeric composition of claim 1 wherein from 0.02% to 1% by weight of tetrapropenylsuccinic anhydride is present based on the polymer.

References Cited by the Examiner

UNITED STATES PATENTS 2,985,617    5/61    Salyer et al. _____ 260—45.85

LEON J. BERCOVITZ, *Primary Examiner.*

ALPHONSO D. SULLIVAN, *Examiner.*